United States Patent
Tang et al.

(10) Patent No.: US 11,748,099 B2
(45) Date of Patent: Sep. 5, 2023

(54) METHOD FOR EXECUTING INSTRUCTIONS, DEVICE, AND COMPUTER READABLE STORAGE MEDIUM

(71) Applicant: BEIJING BAIDU NETCOM SCIENCE AND TECHNOLOGY CO., LTD., Beijing (CN)

(72) Inventors: Chao Tang, Beijing (CN); Xueliang Du, Beijing (CN)

(73) Assignee: BEIJING BAIDU NETCOM SCIENCE AND TECHNOLOGY, CO., LTD., Beijing (CN)

( * ) Notice: Subject to any disclaimer, the term of this patent is extended or adjusted under 35 U.S.C. 154(b) by 97 days.

(21) Appl. No.: 17/377,548

(22) Filed: Jul. 16, 2021

(65) Prior Publication Data

US 2021/0342149 A1 Nov. 4, 2021

(30) Foreign Application Priority Data

Jul. 20, 2020 (CN) .......................... 202010700198.X

(51) Int. Cl.
 *G06F 9/50* (2006.01)
 *G06F 11/34* (2006.01)
 *G06F 9/30* (2018.01)

(52) U.S. Cl.
 CPC ................. *G06F 9/3004* (2013.01)

(58) Field of Classification Search
 None
 See application file for complete search history.

(56) References Cited

U.S. PATENT DOCUMENTS

| 5,481,274 A * | 1/1996 | Aratani ............... G09G 3/3629 345/97 |
| 11,604,735 B1 * | 3/2023 | Segev ................. G06F 12/0891 |
| 2007/0150675 A1 * | 6/2007 | Arimilli ............. G06F 12/0897 711/162 |
| 2016/0110296 A1 * | 4/2016 | Bao ..................... G06F 12/1441 711/102 |

(Continued)

FOREIGN PATENT DOCUMENTS

JP 6227151 B2 11/2017

OTHER PUBLICATIONS

Extended European Search Report for Application No. 21185828.7, dated Dec. 8, 2021, 9 pages.

*Primary Examiner* — Hyun Nam
(74) *Attorney, Agent, or Firm* — Lippes Mathias LLP

(57) ABSTRACT

The disclosure discloses a method for executing instructions, a device and a computer readable storage medium. The detailed implementation includes: obtaining a first memory access instruction for execution, in which the first memory access instruction includes a first address range of a memory to be accessed; in response to detecting a predetermined instruction for monitoring an accessed address range of the memory, executing the predetermined instruction to obtain a remaining address range not accessed by the first memory access instruction in the first address range; comparing the remaining address range with a second address range included in a second memory access instruction to be executed; and suspending execution of the second memory access instruction in response to the remaining address range at least partially overlapping with the second address range.

14 Claims, 3 Drawing Sheets

(56) References Cited

U.S. PATENT DOCUMENTS

| | | | | |
|---|---|---|---|---|
| 2016/0147446 A1* | 5/2016 | Ghosh | ............... | G06F 12/0862 |
| | | | | 711/103 |
| 2019/0163639 A1* | 5/2019 | Wu | ............... | G06F 12/0895 |
| 2019/0392156 A1* | 12/2019 | Garlati | ............... | G06F 12/0223 |
| 2021/0342149 A1* | 11/2021 | Tang | ............... | G06F 12/1441 |

* cited by examiner

METHOD FOR EXECUTING INSTRUCTIONS, DEVICE, AND COMPUTER READABLE STORAGE MEDIUM

CROSS REFERENCE TO RELATED APPLICATION

This application is based on and claims priority to Chinese patent application No. 202010700198.X, filed on Jul. 20, 2020, the entire content of which is hereby incorporated into this application.

FIELD

The disclosure relates to a field of computer technologies, and particularly relates to a method for executing instructions, a device and a computer readable storage medium in a field of chips and artificial intelligence.

BACKGROUND

With development of technologies, function of processors become more and more powerful, which makes the processors having more and more important status in technology industry. The processors have developed from original single-core to current multi-core, which greatly improves processing efficiency of the processors.

In addition, with development of artificial intelligence AI technologies, AI processors is also led to develop rapidly. Computing speeds of the current processors are already very fast, which have exceeded read and write efficiency of memories. Therefore, there are still many problems required to be solved in a process of data interaction between the processors and the memories.

SUMMARY

The present disclosure provides a method for executing instructions, a device and a computer readable storage medium in a field of chips and artificial intelligence.

In a first aspect of the disclosure, a method for executing instructions is provided. The method includes: obtaining a first memory access instruction for execution, in which the first memory access instruction includes a first address range of a memory to be accessed; in response to detecting a predetermined instruction for monitoring an accessed address range of the memory, executing the predetermined instruction to obtain a remaining address range not accessed by the first memory access instruction in the first address range; comparing the remaining address range with a second address range included in a second memory access instruction to be executed; and suspending execution of the second memory access instruction in response to the remaining address range at least partially overlapping with the second address range.

In a second aspect of the disclosure, an electronic device is provided. The electronic device includes: one or more processors and a memory. The memory is configured to store instructions executable by the one or more programs. When the instructions are executed by the one or more processors, the one or more processors are configured to: obtain a first memory access instruction for execution, in which the first memory access instruction includes a first address range of a memory to be accessed; in response to detecting a predetermined instruction for monitoring an accessed address range of the memory, execute the predetermined instruction to obtain a remaining address range not accessed by the first memory access instruction in the first address range; compare the remaining address range with a second address range included in a second memory access instruction to be executed; and suspend execution of the second memory access instruction in response to the remaining address range at least partially overlapping with the second address range.

In a third aspect of the disclosure, a non-transitory computer readable storage medium having storing computer instructions is provided. The computer instructions are configured to cause the computer to execute a method for executing instructions. The method includes: obtaining a first memory access instruction for execution, in which the first memory access instruction includes a first address range of a memory to be accessed; in response to detecting a predetermined instruction for monitoring an accessed address range of the memory, executing the predetermined instruction to obtain a remaining address range not accessed by the first memory access instruction in the first address range; comparing the remaining address range with a second address range included in a second memory access instruction to be executed; and suspending execution of the second memory access instruction in response to the remaining address range at least partially overlapping with the second address range.

It should be understood that, the contents described in the Summary are not intended to identify key or important features of embodiments of the disclosure, nor is it intended to limit the scope of the disclosure. Other features of the disclosure will become apparent from the following description.

BRIEF DESCRIPTION OF THE DRAWINGS

The drawings are used to better understand the solution and do not constitute a limitation to the disclosure, in which.

DETAILED DESCRIPTION

Figure 1:
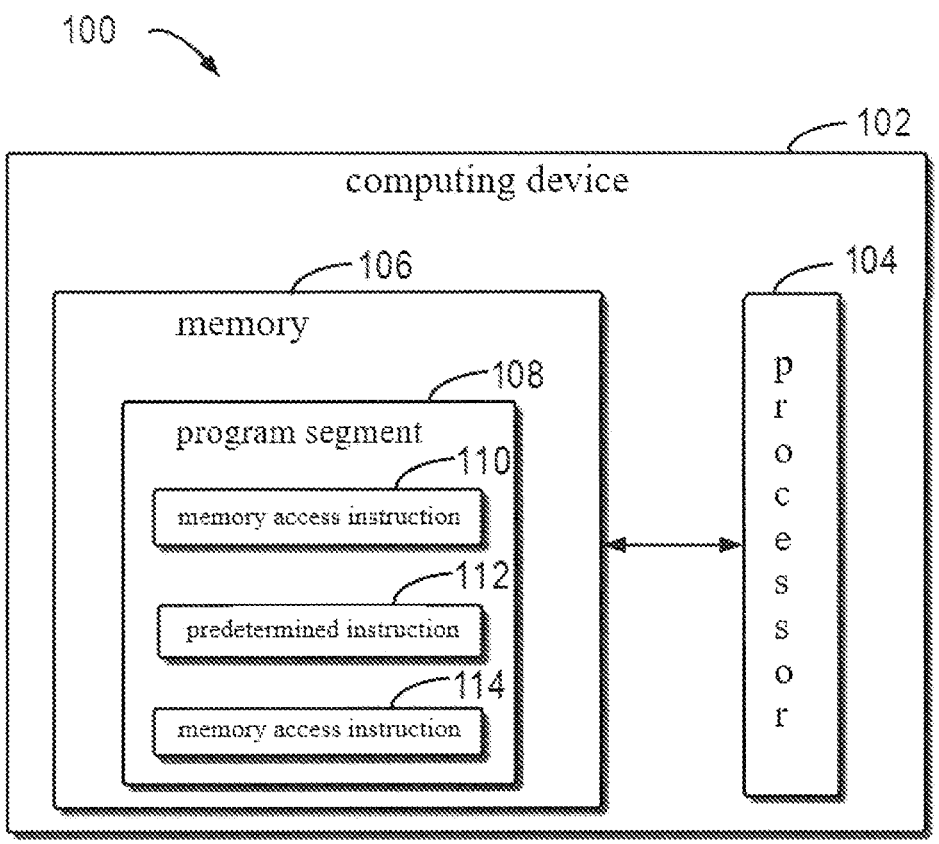
FIG. 1 is a schematic diagram illustrating an environment 100 where multiple embodiments are implemented according to embodiments of the disclosure.

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

In the description of embodiments of the disclosure, the term "includes" and its equivalents should be understood as an open "include" (a non-exclusive "include"), that is, "include but not limited to". The term "based on" should be understood as "based at least in part (at least partially based on)". The term "an embodiment" or "the embodiment" should be understood as "at least one embodiment". The terms "first", "second", and the like may refer to different or the same objects. Other explicit and implicit definitions may also be included below.

With development of processor technologies, computing speeds of current processors have exceeded read and write efficiency of memories. In a progress of the processor executing instructions, the processor often waits for data to be obtained from the memory. Particularly to AI processors, complexity of computing is not high, but the amount of data to be processed is very large. Therefore, transmission efficiency of data in the memory has become a bottleneck in data processing. This situation becomes more serious when the number of cores inside the processor expands.

When the processor accesses the memory, multiple instructions to access the memory have different execution delays, resulting in operations actually initiated on the memory not achieving expectations. In order to avoid this situation, an instruction that manages memory access (such as an mfence instruction) is usually inserted between any two instructions that access the memory. For example, the mfence instructions may be used to separate respective instructions, which causes the next memory access instruction to be read when execution of the previous instruction completes. However, in this way, execution time of the processor is increased and efficiency of the processor is reduced.

In order to solve the above problems, one solution is to restrict the mfence instruction. When the next instruction is not a memory access instruction, the instruction is read normally, and when the next instruction is the memory access instruction, the processor will be blocked. However, although non-memory access instructions may be executed in this way, execution of the next memory access instruction still requires to wait until the execution of the previous memory access instruction completes, so efficiency of data processing between the processor and the memory is still low.

In order to at least solve the above-mentioned problems, an improved scheme for executing instructions is provided according to the embodiments of the present disclosure. A computing device obtains a first memory access instruction for execution, in which the first memory access instruction includes a first address range of a memory to be accessed. The computing device, in response to detecting a predetermined instruction for monitoring an accessed address range of the memory, executes the predetermined instruction to obtain a remaining address range not accessed by the first memory access instruction in the first address range. The computing device compares the remaining address range with a second address range included in a second memory access instruction to be executed. The computing device suspends execution of the second memory access instruction in response to the remaining address range at least partially overlapping with the second address range. With this method, address segment occupied by memory access instructions may be dynamically monitor, determination of the memory access control instructions being blocked may be refined, unnecessary waiting delays of processors may be reduced, and performance of the processor may be improved.

FIG. 1 illustrates an environment 100 where multiple embodiments are implemented according to embodiments of the disclosure. As illustrated in FIG. 1, the environment 100 includes a computing device 102. The computing device 102 may be configure to execute program instructions.

The computing device 102 may include but not limited to a personal computer, a server computer, a handheld or laptop device, a mobile device (such as a mobile phone, a personal digital assistant (PDA), a media player, etc.), multi-processor systems, a consumer electronic product, a small computer, a large computer, a distributed computing environment including any of the above systems or devices, etc.

The computing device 102 includes a processor 104 and a memory 106. The processor 104 may be configure to execute various programs and control access to the memory 106.

The processor 104 may include a hardware processor, which may include but not limited to a hardware central processing unit (CPU), a field programmable gate array (FPGA), a composite programmable logic device (CPLD), an application specific integrated circuit (ASIC), a System on Chip (SoC) or any combination thereof.

As illustrated in FIG. 1, the memory 106 has a program segment 108. The program segment 108 stores program instructions that may be executed by the processor 104, including a memory access instruction 110, a predetermined instruction 112, and another memory access instruction 114. For convenience of description, the memory access instruction 110 may also be referred to as a first memory access instruction, and the another memory access instruction 114 may also be referred to as a second memory access instruction. The program segment 108 illustrated in FIG. 1 including the memory access instruction 110, the predetermined instruction 112, and another memory access instruction 114 is an example. In other embodiments, the program segment 108 may include any number and any suitable type of instructions.

The memory access instruction 110 and another memory access instruction 114 are instructions that require to access the memory 106 when executed. In some embodiments, the memory access instruction 110 and another memory access instruction 114 may include the address ranges of the memory 106 to be accessed. In some embodiments, the memory access instruction 110 and another memory access instruction 114 may be read instructions and write instructions for the memory 106 or any other instructions for accessing the memory 106. The above examples are used to describe the present disclosure, but not to limit the present disclosure.

The predetermined instruction 112 is an instruction for monitoring the accessed address range in the memory 106. In some embodiments, the predetermined instruction 112 is an instruction obtained after adjusting the mfence instruction. When the predetermined instruction 112 is executed, a register or a cache may be scanned every clock cycle to obtain the remaining address space that is not yet accessed by the memory access instruction being executed. In some embodiments, the predetermined instruction 112 stops executing when the execution of the foregoing memory access instruction ends.

In a progress of executing the predetermined instruction 112, when the processor 104 obtains another memory access instruction 114, the second address range in another memory access instruction 114 compares with the obtained remaining address range. Whether to execute another memory access instruction 114 is determined by determining whether the two address ranges overlap. In response to the two address ranges overlapping, another memory access instruction 114 requires to be suspended.

In some embodiments, in the progress of executing the predetermined instruction 112, the stored remaining address range is updated every clock cycle. In response to the obtained updated remaining address range not overlapping with the second address range of the suspended memory access instruction 114, the suspended memory access instruction 114 is executed again. The above examples are used to describe the present disclosure, but not to limit the present disclosure.

With the method according to embodiments of the disclosure, the address segment occupied by the memory access instructions may be dynamically monitor, determination of the memory access control instructions being blocked may be refined, the unnecessary waiting delays of the processor may be reduced, and performance of the processor may be improved.

The above FIG. 1 illustrates the environment 100 where multiple embodiments are implemented according to embodiments of the disclosure. The following illustrates a schematic diagram a structure 200 for storing an address range in a storage device according to embodiments of the disclosure with reference to FIG. 2.

Figure 2:
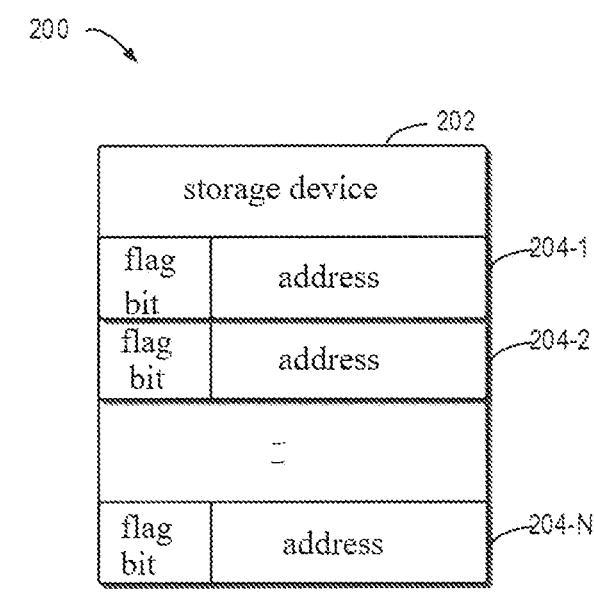
FIG. 2 is a schematic diagram illustrating a structure 200 for storing an address range in a storage device according to embodiments of the disclosure.

As illustrated in FIG. 2, a storage device 202 may store the address range to be accessed included in the obtained memory access instruction. The storage device 202 may be a cache or a register. For example, entries 204-1, 204-2, . . . , 204-N for a plurality of memory access instructions being executed are stored, and N is a positive integer. For convenience of description, these entries are collectively referred to as an entry 204. The entry 204 includes a flag bit part and an address part. The address part is configured to store the address range to be accessed by the memory access instruction. The flag bit is configured to identify whether the entry is valid.

When the memory access instruction is to be executed, the address range in the memory access instruction is stored in the entry 204. After the address range is stored in the entry 204, the flag bit of the entry is set to a first predetermined value, such as 1. After the memory access instruction executing the access to the address range completes, the flag bit is set to a second predetermined value, such as 0.

In some embodiments, when the memory access instruction is executed, the address part in the entry 204 corresponding to the memory access instruction is updated every clock cycle. The updated address part stores the address range that has not been accessed. When the predetermined instruction 112 is executed, the register or cache is periodically scanned to determine the remaining address range that has not yet been accessed.

In some embodiments, when the memory access instruction is executed, the address range to be accessed is stored in the entry 204. When the predetermined instruction 112 is detected and then executed, the address part of the entry 204 is updated to the remaining address range that has not yet been accessed, and then the register or cache is periodically scanned to determine the remaining address range that has not yet been accessed. The above examples are used to describe the present disclosure, but not to limit the present disclosure.

Figure 3:
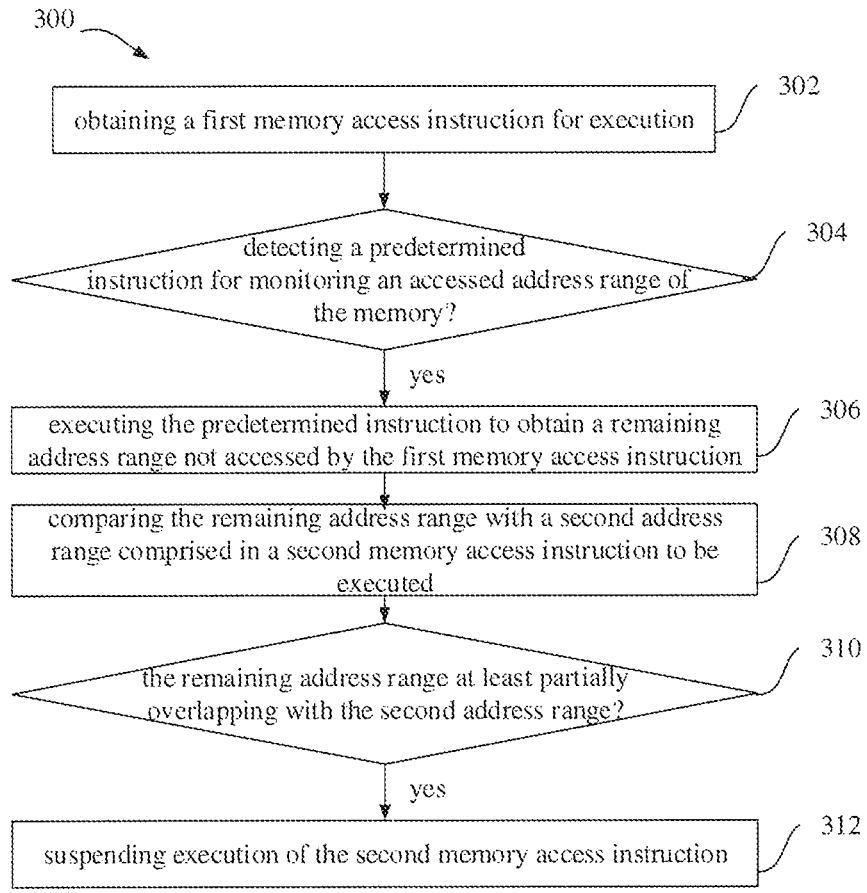
FIG. 3 is a flow chart illustrating a method 300 for executing instructions according to embodiments of the disclosure.

The above FIG. 2 illustrates the schematic diagram of the structure 200 for storing the address range in the storage device according to the embodiments of the disclosure. The following describes a flowchart of a method 300 for executing instructions according to some embodiments of the present disclosure with reference to FIG. 3. The method 300 may be implemented by the computing device 102 in FIG. 1 or any other suitable devices.

At block 302, the computing device obtains the first memory access instruction for execution, and the first memory access instruction includes the first address range of the memory to be accessed. For example, the computing device 102 in FIG. 1 obtains the first memory access instruction when executing a program. The computing device 102 then executes the first memory access instruction.

In some embodiments, the computing device 102 receives the first memory access instruction. The first memory access instruction includes the address range to be accessed, which is also referred to as the first address range for convenience of description. When executing the first memory access instruction, the computing device 102 may store the first address range into the register or the cache. In an example, the first address range is stored in the register, and then a flag bit of the corresponding register is set to a predetermined value. In another example, the first address range is stored in the cache. After the first address range is stored in the cache, a corresponding a flag bit is set to identify that this address range is the address range to be accessed by the memory access instruction. The above examples are used to describe the present disclosure, but not to limit the present disclosure. In this way, the first address space may be used to quickly determine the remaining address range.

At block 304, the computing device determines whether the predetermined instruction for monitoring the accessed address range of the memory is detected. As illustrated in FIG. 1, the computing device 102 detects the predetermined instruction 112 for monitoring the accessed address range in the memory.

In some embodiments, in response to no predetermined instruction 112 for monitoring the address range of the memory being detected, obtaining the subsequent instructions is continued, and then executing the subsequent obtained instructions is continued. Through the above method, other instructions may be executed quickly when the predetermined instruction 112 is not detected.

When the predetermined instruction 112 for monitoring the accessed address range in the memory is detected, at block 306, the computing device executes the predetermined instruction 112 to obtain the remaining address range not accessed by the first memory access instruction in the first address range. As illustrated in FIG. 1, when the predetermined instruction 112 is detected during the execution of an instruction, for example, when a fence instruction for adjusting is detected, the computing device 102 may execute the predetermined instruction 112. At this time, the computing device 102 may obtain the remaining address range that has not been accessed by the memory access instruction prior to the predetermined instruction 112.

In some embodiments, the computing device 102 determines the accessed address range that has been accessed by the first memory instruction in response to detecting the predetermined instruction; and determines the remaining address interval based on the accessed address range. In this way, the address range that has not yet been accessed by the memory access instruction may be quickly and timely obtained.

In an example, when the first memory access instruction is executed, the first address range to be accessed by the first memory access instruction is written into the register or cache. When the predetermined instruction 112 is executed, the address range accessed by the first memory access instruction is detected, and the accessed address range is removed from the first address range stored in the register or cache to determine the remaining address range. Then the first address range in the register or cache is updated to the remaining address range that has not been accessed. Alternatively or additionally, in each clock cycle, the remaining address range that has not been accessed is updated based on the address range that has been accessed by the first memory access instruction.

In some examples, when the first memory access instruction is executed, the first address range is saved. When the memory access instruction is executed, the first address range is periodically updated to the remaining address range that has not been accessed every clock cycle. When the predetermined instruction 112 is executed, the register or cache is scanned to obtain the remaining address range.

In some embodiments, the computing device 102 obtains the remaining address range in each clock cycle. For example, when the predetermined instruction 112 is executed, the remaining address range is obtained at the end of each clock cycle. The above examples are used to describe the present disclosure, but not to limit the present disclosure. In this way, the accurate remaining address range may be obtained timely.

At block 308, the computing device compares the remaining address range with the second address range included in the second memory access instruction to be executed. At block 310, the computing device determines whether the remaining address range at least partially overlapping with the second address range.

At block 312, the computing device suspends the execution of the second memory access instruction in response to the remaining address range at least partially overlapping with the second address range. When the overlap exists, it indicates that the first memory access instruction and the second memory access instruction access the same address space. In order to ensure security and consistency of data, the second memory access instruction accessing to the memory requires to be suspended.

Figure 4:
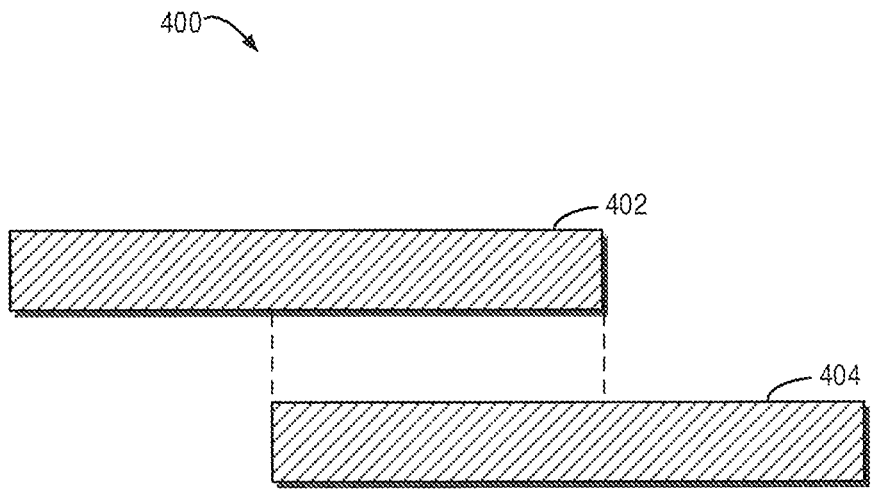
FIG. 4 is a schematic diagram illustrating an example 400 of an address range according to embodiments of the disclosure.

Combination with FIG. 4, the process of determining overlap is described below. FIG. 4 illustrates a schematic diagram of an example 400 of an address range according to embodiments of the disclosure. The address range 402 in FIG. 4 is the remaining address range accessed by the first memory instruction. Another address range 404 is the second address range accessed by the second memory access instruction. As illustrated in FIG. 4, the address ranges 402 and 404 are partially identical, which indicates that the two address ranges partially overlap. FIG. 4 is used to describe an example of overlap, and is not limit to the present disclosure.

Return to FIG. 3 to continue the description. In some embodiments, the computing device 102 periodically determines whether an overlapping range between the remaining address range and the second address range has been accessed by the first memory access instruction. For example, after obtaining the updated remaining address range every clock cycle, the computing device 102 determines whether the overlapping range between the remaining address range and the second address range has been accessed by the first memory access instruction. Executing the suspended second memory access instruction continues in response to the first memory access instruction accessing the overlapping range. Alternatively or additionally, when the second address range of the second memory access instruction also overlaps with the remaining address space of other memory access instructions executed prior to the predetermined instruction, executing the second memory access instruction is required to wait after the overlapping range that overlaps with the second address range is all accessed. In this way, the suspended instruction may be executed timely, which improves processing efficiency of the instructions.

In some embodiments, the computing device 102 executes the second memory access instruction in response to the remaining address range not overlapping with the second address range. In this way, it may be ensured that instructions that do not access overlapping address ranges are processed timely, which improves processing efficiency of the instructions and saves processing time of the instructions.

With the method according to embodiments of the disclosure, the address segment occupied by the memory access instructions may be dynamically monitor, determination of the memory access control instructions being blocked may be refined, the unnecessary waiting delays of the processor may be reduced, and the performance of the processor may be improved.

Figure 5:
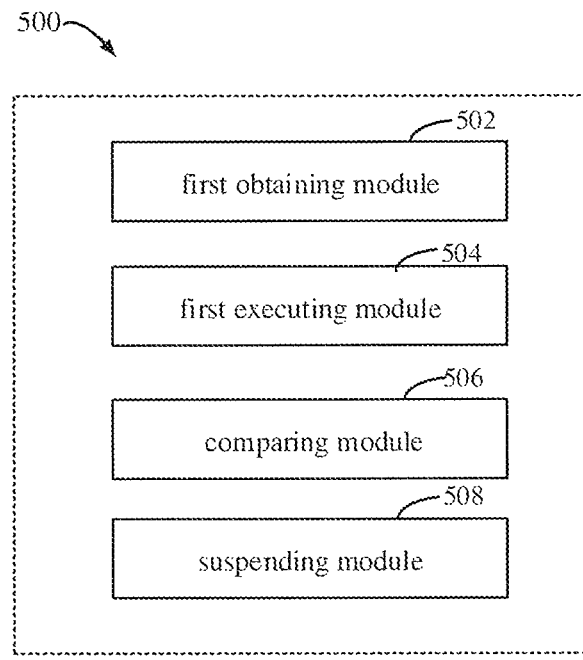
FIG. 5 is a block diagram illustrating an apparatus 500 for executing instructions according to embodiments of the disclosure.

FIG. 5 is a block diagram illustrating an apparatus 500 for executing instructions according to embodiments of the disclosure. As illustrated in FIG. 5, the apparatus 500 may include a first obtaining module 502 configured to obtain a first memory access instruction for execution, and the first memory access instruction includes a first address range of a memory to be accessed. The apparatus 500 further includes a first executing module 504 configured to, in response to detecting a predetermined instruction for monitoring an accessed address range of the memory, execute the predetermined instruction to obtain a remaining address range not accessed by the first memory access instruction in the first address range. The apparatus 500 further includes a comparing module 506 configured to compare the remaining address range with a second address range included in a second memory access instruction to be executed. The apparatus 500 further includes a suspending module 508 configured to suspend execution of the second memory access instruction in response to the remaining address range at least partially overlapping with the second address range.

In some embodiments, the apparatus 500 further includes a continuing executing module configured to execute the suspended second memory access instruction in response to an overlapping range between the remaining address range and the second address range having been accessed by the first memory access instruction.

In some embodiments, the apparatus 500 further includes a second executing module configured to execute the second memory access instruction in response to the remaining address range not overlapping with the second address range.

In some embodiments, the first obtaining module 503 includes: a receiving sub-module configured to receive the first memory access instruction, and a first determining sub-module configured to determine the first address range included in the first memory instruction, and a storing sub-module configured to store the first address range into a register or a cache.

In some embodiments, the first executing module 504 includes a second determining sub-module configured to determine the accessed address range that has been accessed by the first memory instruction in response to detecting the predetermined instruction, and a third determining sub-module configured to determine the remaining address interval based on the accessed address range.

In some embodiments, the apparatus 500 further includes a second obtaining module configured to obtain the remaining address range in each clock cycle.

In some embodiments, the apparatus 500 further includes a third executing module configured to execute a third program instruction in response to no predetermined instruction for monitoring the address range of the memory being detected.

According to embodiments of the disclosure, the disclosure also provides an electronic device and a readable storage medium.

Figure 6:
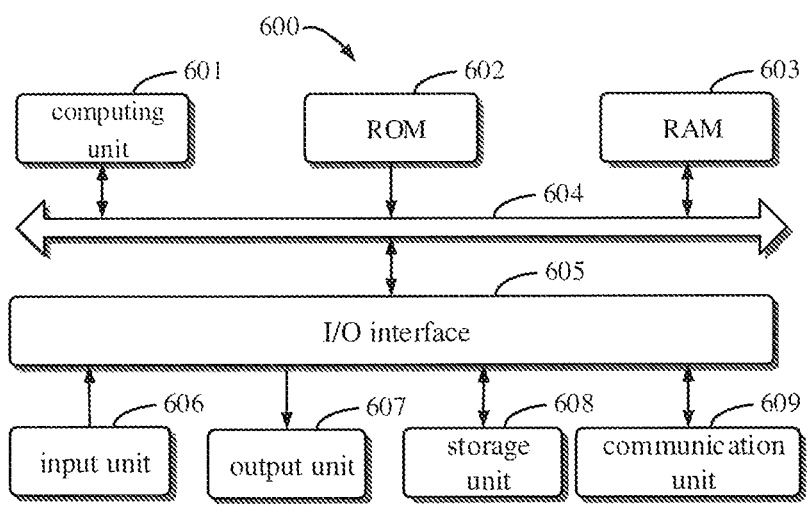
FIG. 6 is a block diagram illustrating a device 600 according to embodiments of the disclosure.

As illustrated in FIG. 6, FIG. 6 is a block diagram illustrating an electronic device according to embodiments of the disclosure. The device 600 may be configured to implement the computing device 102 in FIG. 1. As illustrated in FIG. 6, the device 600 includes a computing unit 601, which may execute various appropriate acts and processing based on computer program instructions stored in a read-only memory (ROM) 602 or computer program instructions loaded from a storage unit 608 to a random-access memory (RAM) 603. In the RAM 603, various programs and data required for the operation of the device 600 may be stored. The computing unit 601, the ROM 602, and the RAM 603 are connected to each other through a bus 604. An input/output (I/O) interface 605 is also connected to the bus 604.

Multiple components in the device 600 are connected to the I/O interface 605, including: an input unit 606, such as a keyboard, a mouse, etc.; an output unit 607, such as various types of displays, speakers, etc.; the storage unit 608, such as a disk, a CD, etc.; and a communication unit 609, such as a network card, a modem, a wireless communication transceiver, etc. The communication unit 609 allows the device 600 to exchange information/data with other devices via computer networks such as the Internet and/or various telecommunications networks.

The computing unit 601 may be various general and/or special processing components with processing and computing capabilities. Some examples of the computing unit 601 may include, but not limited to, a central processing unit (CPU), a graphics processing unit (GPU), various dedicated artificial intelligence (AI) computing chips, various computing units that run machine learning model algorithms, and a digital signal processing (DSP), and any appropriate processor, controller, microcontroller, etc. The computing unit 601 executes the various methods and procedures described above, such as the method 300. For example, in some embodiments, the method 200 may be implemented as computer software programs, which are physically contained in a machine-readable medium, such as the storage unit 608. In some embodiments, some or all of the computer programs may be loaded and/or installed on the device 600 via the ROM 602 and/or the communication unit 609. The computer programs may execute one or more acts or steps of the method 200 described above when loaded to the RAM 603 and executed by the computing unit 601. Alternatively, in other embodiments, the computing unit 601 may be configured to execute the method 300 by any other appropriate ways (such as, by means of a firmware).

The above functions described herein may be executed at least partially by one or more hardware logic components. For example, without limitation, exemplary types of hardware logic components, including a field-programmable gate array (FPGA), an application-specific integrated circuit (ASIC), an application specific standard product (ASSP), a system on chip (SOC), a load programmable logic device (CPLD) and so on, may be used.

The program codes for implementing the method of embodiments of the present disclosure may be written in any combination of one or more program languages. These program codes may be provided for a processor or a controller of a general-purpose computer, a special-purpose computer, or other programmable data-processing devices, such that the functions/operations regulated in the flow charts and/or block charts are implemented when the program codes are executed by the processor or the controller. The program codes may be completely executed on the machine, partly executed on the machine, partly executed on the machine as a standalone package and partly executed on a remote machine or completely executed on a remote machine or a server.

In the context of the present disclosure, the machine readable medium may be a tangible medium, which may include or store the programs for use of an instruction execution system, apparatus or device or for use in conjunction with the instruction execution system, apparatus or device. The machine readable medium may be a machine readable signal medium or a machine readable storage medium. The machine readable medium may include but not limited to electronic, magnetic, optical, electromagnetic, infrared, or semiconductor systems, apparatuses or devices, or any, appropriate combination of the foregoing contents. A more detailed example of the machine readable storage medium includes electrical connections based on one or more lines, a portable computer disk, a hard disk, a random access memory (RAM), a read-only memory (ROM), an erasable programmable read only memory (an EPROM or a flash memory), an optical fiber, a compact disc read-only memory (CD-ROM), an optical storage device, a magnetic storage device, or any appropriate combination of the above contents.

In addition, although respective act or step is described in a particular sequence, it should be understood that such act or step are required to be executed in the specified or sequential order as illustrated, or all illustrated acts or steps are required to be executed to achieve a desired result. Under certain environment, multitasking and parallel processing may be beneficial. In the same way, although several specific implementation details are included in the above discussion, these should not be interpreted as limitations of the scope of the present disclosure. Certain features described in the context of a single embodiment may also be in a combination manner to be implemented in a single implementation. On the contrary, the various features described in the context of a single implementation may also be implemented in multiple implementations individually or in any appropriate sub-combination.

Although language specific to structural features and/or method logic actions has been employed to describe the embodiments of the present disclosure, it should be understood that the subject matter defined in the appended claims is not necessarily limited to the specific features or acts described above. On the contrary, the specific features or acts described above are merely an exemplary form for implementing the claims.

What is claimed is:

1. A method for executing instructions, comprising:
obtaining a first memory access instruction for execution, wherein the first memory access instruction comprises a first address range of a memory to be accessed;
in response to detecting a predetermined instruction for monitoring an accessed address range of the memory, executing the predetermined instruction to obtain a remaining address range not yet accessed by the first memory access instruction in the first address range;

comparing the remaining address range with a second address range comprised in a second memory access instruction to be executed;

suspending execution of the second memory access instruction in response to the remaining address range at least partially overlapping with the second address range;

continuing to execute the suspended second memory access instruction in response to an overlapping range between the remaining address range and the second address range having been accessed by the first memory access instruction; and executing the second memory access instruction in response to the remaining address range not overlapping with the second address range.

2. The method according to claim 1, wherein obtaining the first memory access instruction comprises:

receiving the first memory access instruction;

determining the first address range comprised in the first memory instruction; and storing the first address range into a register or a cache.

3. The method according to claim 1, wherein obtaining the remaining address range comprises:

determining the accessed address range that has been accessed by the first memory instruction in response to detecting the predetermined instruction; and determining the remaining address interval based on the accessed address range.

4. The method according to claim 1, further comprising:

obtaining the remaining address range in each clock cycle.

5. The method according to claim 1, further comprising:

executing a third program instruction in response to no predetermined instruction for monitoring the address range of the memory being detected.

6. An electronic device, comprising:

one or more processors; and a memory, configured to store one or more programs;

wherein the memory is configured to store instructions executable by the one or more programs, when the instructions are executed by the one or more processors, the one or more processors are configured to:

obtain a first memory access instruction for execution, wherein the first memory access instruction comprises a first address range of a memory to be accessed;

in response to detecting a predetermined instruction for monitoring an accessed address range of the memory, execute the predetermined instruction to obtain a remaining address range not yet accessed by the first memory access instruction in the first address range;

compare the remaining address range with a second address range comprised in a second memory access instruction to be executed; and suspend execution of the second memory access instruction in response to the remaining address range at least partially overlapping with the second address range;

wherein the one or more processors are configured to:

execute the suspended second memory access instruction in response to an overlapping range between the remaining address range and the second address range having been accessed by the first memory access instruction; and execute the second memory access instruction in response to the remaining address range not overlapping with the second address range.

7. The electronic device according to claim 6, wherein the one or more processors are configured to:

receive the first memory access instruction;

determine the first address range comprised in the first memory instruction; and store the first address range into a register or a cache.

8. The electronic device according to claim 6, wherein the one or more processors are configured to:

determine the accessed address range that has been accessed by the first memory instruction in response to detecting the predetermined instruction; and determine the remaining address interval based on the accessed address range.

9. The electronic device according to claim 6, wherein the one or more processors are configured to:

obtain the remaining address range in each clock cycle.

10. The electronic device according to claim 6, wherein the one or more processors are configured to:

execute a third program instruction in response to no predetermined instruction for monitoring the address range of the memory being detected.

11. A non-transitory computer readable storage medium storing computer instructions, wherein the computer instructions are configured to cause the computer to execute a method for executing instructions, the method comprises:

obtaining a first memory access instruction for execution, wherein the first memory access instruction comprises a first address range of a memory to be accessed;

in response to detecting a predetermined instruction for monitoring an accessed address range of the memory, executing the predetermined instruction to obtain a remaining address range not yet accessed by the first memory access instruction in the first address range;

comparing the remaining address range with a second address range comprised in a second memory access instruction to be executed;

suspending execution of the second memory access instruction in response to the remaining address range at least partially overlapping with the second address range;

continuing to execute the suspended second memory access instruction in response to an overlapping range between the remaining address range and the second address range having been accessed by the first memory access instruction; and executing the second memory access instruction in response to the remaining address range not overlapping with the second address range.

12. The storage medium according to claim 11, wherein obtaining the first memory access instruction comprises:

receiving the first memory access instruction;

determining the first address range comprised in the first memory instruction; and storing the first address range into a register or a cache.

13. The storage medium according to claim 11, wherein obtaining the remaining address range comprises:

determining the accessed address range that has been accessed by the first memory instruction in response to detecting the predetermined instruction; and determining the remaining address interval based on the accessed address range.

14. The storage medium according to claim 11, wherein the method further comprises:

obtaining the remaining address range in each clock cycle.

* * * * *